US009452555B2

(12) United States Patent
Toyota et al.

(10) Patent No.: US 9,452,555 B2
(45) Date of Patent: Sep. 27, 2016

(54) METAL INSERT-MOLDED ARTICLE, A METHOD FOR PRODUCING THE SAME, AND AN ELECTRONIC COMPONENT

(71) Applicant: OMRON Corporation, Kyoto-Shi (JP)

(72) Inventors: Ryo Toyota, Nagaokakyo (JP); Kyoji Kitamura, Uji (JP); Koji Yamamoto, Takatsuki (JP); Tomoyuki Nishida, Takatsuki (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 14/382,470

(22) PCT Filed: Mar. 4, 2013

(86) PCT No.: PCT/JP2013/055866
§ 371 (c)(1),
(2) Date: Sep. 2, 2014

(87) PCT Pub. No.: WO2013/137046
PCT Pub. Date: Sep. 19, 2013

(65) Prior Publication Data
US 2015/0109722 A1    Apr. 23, 2015

(30) Foreign Application Priority Data
Mar. 12, 2012  (JP) .................... 2012-054994

(51) Int. Cl.
*H05K 7/00* (2006.01)
*B29C 45/14* (2006.01)
(Continued)

(52) U.S. Cl.
CPC ... *B29C 45/14311* (2013.01); *B29C 45/14639* (2013.01); *B29C 45/14778* (2013.01);
(Continued)

(58) Field of Classification Search
USPC ........ 361/728–730, 752, 796, 800; 439/76.1, 439/164, 736
See application file for complete search history.

(56) References Cited

U.S. PATENT DOCUMENTS 4,868,047 A * 9/1989 Hasegawa et al. .......... 428/324
7,830,008 B2 * 11/2010 Kimura et al. ............... 257/741
(Continued)

FOREIGN PATENT DOCUMENTS

DE    199 00 632 A1    7/2000
JP    03-285945 A    12/1991
(Continued)

OTHER PUBLICATIONS

International Search Report for Application No. PCT/JP2013/055866, mailed Jun. 4, 2013 (4 pages).
(Continued)

*Primary Examiner* — Hung S Bui
(74) *Attorney, Agent, or Firm* — Nutter McClennen & Fish LLP; John J. Penny, Jr.; Santiago Velez (57) ABSTRACT

A metal insert-molded article having sealing ability, a method for producing the same, and an electronic component having the metal insert-molded article, the metal insert-molded article comprising: a molding material and a metal material integrally molded together by insert molding, wherein the molding material comprises a crystalline thermoplastic resin as a main component, and comprises an inorganic filler in an amount inclusive of 0% by weight to 15% by weight, and the metal material has an aspect ratio inclusive of 1 to 10 in a cross section perpendicular to a lengthwise dimension of the metal insert-molded article, and is not surface treated for adhesion with the molding material.

8 Claims, 5 Drawing Sheets

(51) Int. Cl.
     *B29C 45/00* (2006.01)
     *B29K 705/00* (2006.01)
     *B29K 101/12* (2006.01)
     *B29K 509/00* (2006.01)
     *B29K 105/16* (2006.01)
     *C08K 3/36* (2006.01)

(52) U.S. Cl.
     CPC ........ *B29C45/0013* (2013.01); *B29K 2101/12* (2013.01); *B29K 2105/16* (2013.01); *B29K 2509/00* (2013.01); *B29K 2705/00* (2013.01); *B29K 2995/0041* (2013.01); *C08K 3/36* (2013.01); *C08K 2201/016* (2013.01); *Y10T 428/31678* (2015.04)

(56) References Cited

U.S. PATENT DOCUMENTS

2005/0134104 A1    6/2005  Simmons et al.
2006/0001192 A1    1/2006  Oohashi et al.
2007/0167047 A1    7/2007  Ohashi et al.
2011/0076883 A1*   3/2011  Jol ................................ 439/521

FOREIGN PATENT DOCUMENTS

| JP | 11-226991 A | 9/1999 |
| JP | 2001-225352 A | 8/2001 |
| JP | 2006-179229 A | 7/2006 |
| JP | 2010-150320 A | 7/2010 |
| WO | 2005/091441 A1 | 9/2005 |

OTHER PUBLICATIONS

Extended European Search Report for Application No. 13760757.8, issued Oct. 8, 2015 (7 pages).

Japanese Office Action for Application No. 2012-054994, issued Dec. 1, 2015 (11 pages).

* cited by examiner

METAL INSERT-MOLDED ARTICLE, A METHOD FOR PRODUCING THE SAME, AND AN ELECTRONIC COMPONENT

CROSS-REFERENCE TO RELATED APPLICATION

This application claims the benefit of priority from PCT Application No. PCT/JP2013/055866 filed on Mar. 4, 2013 and Japanese Patent Application No. 2012-054994, filed on 12 Mar. 2012, the entire contents of which is incorporated herein by reference for all purposes.

FIELD

The present invention relates to a metal insert-molded article having sealing ability, which is formed by insert molding a metal material having a predetermined aspect ratio by using a molding material containing a predetermined amount of an inorganic filler, an electronic component having sealing ability and provided with the metal insert-molded article, and a method for producing the metal insert-molded article.

BACKGROUND

In electronic component industries, demand for lighter, thinner, shorter and smaller components is high, and to meet the demand, it becomes essential to reduce the number of components and combine the components.

For example, for coupling different materials, such as a molding material and a metal material, there has been employed a method in which after components are individually formed, an adhesive is applied, and cured with energy of heat, UV or the like, or a method in which grease is applied to an interface between different materials to fill gaps. This allows a certain level of airtightness to be achieved, but an adhesive coating thickness and a region for application of an adhesive are required, causing a bottleneck in thickness reduction and size reduction of electronic components.

In the injection molding method, a molding material is melted by heating for improving fluidity of the molding material, poured in a mold, and cooled/solidified to obtain a three-dimensionally shaped product. Particularly, for preparing a combined component of a molding material and a metal material, the metal material is placed in a mold beforehand, and insert-molded to combine the materials.

However, conventional insert-molded electronic components have a problem that peeling occurs at a coupled portion of the electronic components under an operation environment, and a problem that in the case of electronic components having a hollow structure. Hence, airtightness at an interface between a molding material and a metal material cannot be maintained, and therefore water or moisture enters the inside (hollow structure) of the electronic component to adversely affect operations of the electronic component.

In view of these problems, methods of surface-treating a metal material have been employed as a technique for enhancing airtightness between a molding material and a metal material, and for example, there have been proposed a method in which a surface of a metal to be inserted is treated with a triazine thiol-based surface treatment agent beforehand [Patent Document 1: Japanese Unexamined Patent Publication No. 2006-179229 (published on 6 Jul. 2006)] and a method in which a roughening treatment is performed by chemical etching [Patent Document 2: Japanese Unexamined Patent Publication No. 2001-225352 (published on 21 Aug. 2001)]. [0008] However, in the method described in Patent Document 1, a surface treatment agent may corrode the inside of an electronic component to cause a failure of electrical characteristics of the electronic component.

The method described in Patent Document 2 has a problem that a loss of a metal surface occurs when a dissolution reaction during etching occurs excessively, and in the case of a metal having a protective layer such as a plating film, the metal will be corroded due to detachment of the protective film by the etching, leading to failure of the electrical characteristics of the electronic component.

In addition, both the methods in Patent Documents 1 and 2 have a problem that the process is complicated because preliminary work such as elaborate washing and drying of a metal surface and surface treatment before insert molding are required. Thus, a technique for changing the above-mentioned situation is desired.

SUMMARY

According with one aspect of an embodiment of the present invention, there is provided a metal insert-molded article having sealing ability, the metal insert-molded article comprising: a molding material and a metal material integrally molded together by insert molding, wherein the molding material comprises a crystalline thermoplastic resin as a main component, and comprises an inorganic filler in an amount of 0% by weight to 15% by weight, and the metal material has an aspect ratio of 1 to 10 in a cross section perpendicular to a lengthwise direction of the metal material, and is not surface-treated for adhesion with the molding material.

According with another aspect of an embodiment of the present invention, there is provided an electronic component having sealing ability, the electronic component comprising: the metal insert-molded article; and a hollow structure in an inner part of the electronic component, wherein at least a part of an interface between the molded material and the metal material of the metal insert-molded article is exposed on a surface of the electronic component.

According with yet another aspect of an embodiment of the present invention, there is provided a method for producing a metal insert-molded article having sealing ability, the method comprising: a step of insert molding a metal material using a molding material, the molding material comprising a crystalline thermoplastic resin as a main component, and comprising an inorganic filler in an amount of 0% by weight to 15% by weight, wherein the metal material has an aspect ratio of 1 to 10 in a cross section perpendicular to a lengthwise direction of the metal material, and is not surface-treated for adhesion with the molding material.

BRIEF DESCRIPTION OF THE DRAWINGS

FIGS. 2(a) to 2(c) are sectional views of a metal material used in a metal insert-molded article according to one embodiment of the present invention.

DETAILED DESCRIPTION

Embodiments of the present invention have been devised in view of the problems described earlier, and an object of an embodiment of the present invention is to provide a metal insert-molded article having sealing ability, which is capable of maintaining proper airtightness between a molding material and a metal material without necessity to subject a metal surface to a surface treatment with a triazine thiol-based surface treatment agent or etching.

Inventors of the present invention have conducted detailed studies on the above-described problems, and discovered the following fact. Generally, in electronic components, a thermoplastic resin containing an inorganic filler of about 30% by weight can be used as a molding material for securing mechanical strength. In insert molding, a metal material can be tightened by means of a state change such as liquefaction or solidification, i.e. a physical change, of a molding material by heating and cooling thereof. However, when the thermoplastic resin is used, presence of the inorganic filler causes the molding material to show anisotropy during shrinkage and the metal material cannot be tightened with a uniform force. As result, it is difficult to sufficiently obtain airtightness at an interface between the molding material and the metal material.

Thus, the present inventors have conducted detailed studies to solve such a problem resulting from the presence of the inorganic filler without using the surface treatment and etching disclosed in Patent Document 1 [Japanese Unexamined Patent Publication No. 2006-179229 (published on 6 Jul. 2006] and Patent Document 2 [Japanese Unexamined Patent Publication No. 2001-225352 (published on 21 Aug. 2001)], and devised the present invention through trial and error.

For solving the above-described problems, a metal insert-molded article having sealing ability according to an embodiment of the present invention is a metal insert-molded article having sealing ability, which is formed by integrally molding a molding material and a metal material by insert molding. The molding material has a crystalline thermoplastic resin as a main component, and contains an inorganic filler in an amount of 0% by weight to 15% by weight, and the metal material has an aspect ratio of 1 to 10 in a cross section perpendicular to a lengthwise direction of the metal material, and is not surface-treated for adhesion with the molding material.

As a result, there is provided a metal insert-molded article having excellent adhesion between a molding material and a metal material without requiring a chemical bond at an interface between the molding material and the metal material or a step of etching a metal surface.

One embodiment of the present invention will be described in detail below. All scientific documents and patent documents cited herein are incorporated herein by reference. Unless otherwise defined herein, "A to B" representing a numerical value range means "not less than A (including A and greater than A) and not more than B (including B and smaller than B)". "%" means "% by weight", and "part(s)" means "part(s) by weight".

For the sake of convenience of explanation, members having the same function are given the same symbol.

[1. Metal Insert-Molded Article Having Sealing Ability]

A metal insert-molded article having sealing ability according to an embodiment of the present invention is a metal insert-molded article having sealing ability, which is formed by integrally molding a molding material and a metal material by insert molding. The molding material has a crystalline thermoplastic resin as a main component, and contains an inorganic filler in an amount of 0% by weight to 15% by weight, and the metal material has an aspect ratio of 1 to 10 in a cross section perpendicular to a lengthwise direction of the metal material, and is not surface-treated for adhesion with the molding material.

The phrase "having sealing ability" herein means that the acceptance criterion of airtightness is satisfied in the airtightness evaluation method used in examples described later without necessity to apply an adhesive to an interface between a molding material and a metal material and/or to subject a metal surface to a surface treatment such as etching.

The molding material has a crystalline thermoplastic resin as an essential component. The molding material may be composed only of a crystalline thermoplastic resin, or composed of a crystalline thermoplastic resin and an inorganic filler, or composed of a crystalline thermoplastic resin and an additive described later, or composed of a crystalline thermoplastic resin, an inorganic filler and the additive.

The phrase "having a crystalline thermoplastic resin as a main component" means that the content of the crystalline thermoplastic resin is relatively higher than the contents of other components.

The crystalline thermoplastic resin is not particularly limited, and examples include polyethylene, polypropylene, polyamide, polyacetal, polybutylene terephthalate (PBT), polyphenylene sulfide (PPS), polyethylene terephthalate (PET), liquid crystal polymers (LCP), polyether ether ketone (PEEK) and polytetrafluoroethylene (PTFE).

These crystalline thermoplastic resins may be used alone, or used in combination of two or more thereof.

Further, the molding material contains an inorganic filler. The inorganic filler may be an oxide such as $SiO_2$, $MgO$, $CaO$, $Al_2O_3$, $Na_2O$, $K_2O$ or $Fe_2O_3$, and is not particularly limited.

The shape and type of the inorganic filler are not particularly limited as long as the shrinkage anisotropy of the molding material is not impaired (shrinkage anisotropy is not significantly increased). The inorganic filler may have a shape such as a fibrous shape, a spherical shape or a cylindrical shape as long as the shrinkage anisotropy of the molding material is not impaired, and one inorganic filler may be used, or two or more inorganic fillers may be used in combination.

The molding material contains an inorganic filler in an amount of 0% by weight to 15% by weight based on 100% by weight of the molding material.

Generally, a molding material to be used in electronic components contains about 30% by weight of an inorganic filler to have sufficient mechanical strength, and has high shrinkage anisotropy. In insert molding, the crystalline thermoplastic resin is shrunk in a direction of tightening of the metal material, but when shrinkage anisotropy is high, a gap is formed at an interface between the resin (molding material) and the metal material. When the content of the inorganic filler is 0% by weight to 15% by weight, shrinkage anisotropy can be decreased to reduce the gap. Accordingly, airtightness can be enhanced and a metal insert-molded article excellent in sealing ability can be provided.

The content of the inorganic filler may be 0% by weight based on 100% by weight of the molding material. The mechanical strength of the molding material is enhanced as the content of the inorganic filler increases. Thus, in this case, the mechanical strength of the molding material is insufficient, but there is no problem associated with shrinkage anisotropy.

The mechanical strength of the molding material is preferably high, but in the field of electronic components such as switches and relays, there are applications where even a molding material having an insufficient mechanical strength can be used satisfactorily as long as it has high airtightness. Examples of such applications include housing portions of connectors having elasticity and high airtightness, and sliding relays and switches requiring slidability and abrasion resistance rather than mechanical strength and high airtightness.

In the embodiment of the present invention, a predetermined metal material adjusted to have an aspect ratio of 1 to 10 in a cross section perpendicular to a lengthwise direction of the predetermined metal material is inserted. Therefore even when the content of the inorganic filler in the molding material is 0% by weight, a metal insert-molded article obtained can have excellent airtightness and can exhibit high sealing ability as shown in examples described later.

Since it is not necessary to use an adhesive, and there is no need to provide a chemical bond at an interface between the molding material and the metal material or etch a metal surface, the metal material is not corroded, and thick coating is unnecessary, as such size reduction of the metal material can be achieved.

Thus, a case where the content of the inorganic filler is 0% by weight is also included in the embodiment of the present invention because sufficient usefulness is present.

The content of the inorganic filler in the molding material is preferably 5% by weight to 15% by weight. In this case, as shown in examples described later, airtightness obtained at an interface between the molding material and the metal material in the metal insert-molded article can be kept sufficiently high, and the mechanical strength of the metal insert-molded article can be sufficiently enhanced. Hence, the metal insert-molded article can be suitable for use as a switch or the like, which can be repeatedly turned ON/OFF.

The molding material may contain an additive. Examples of the additive include a flame retardant, a release agent, a lubricant, a heat stabilizer and a colorant. These additives may be used alone, or used in combination of two or more thereof.

The content of the additive is not particularly limited as long as airtightness of the metal insert-molded article is not affected, but the content of the additive is preferably 5% by weight to 25% by weight in total based on 100% by weight of the molding material. When two or more additives are used in combination, the ratio of each additive is not particularly limited.

The method for adding the additive is not particularly limited. Examples may include a method in which when a crystalline thermoplastic resin and an inorganic filler are melted and kneaded, the additive is added so that the content thereof is 5% by weight to 25% by weight in total based on 100% by weight of the molding material.

The material of the metal material to be used in the embodiment of the present invention is not particularly limited, and copper, aluminum or the like, or an alloy thereof, etc. can be used as appropriate according to an application. However, the metal material is required to be a metal material which is not surface-treated for adhesion with the molding material.

The phrase "not surface-treated for adhesion with the molding material" herein means that a surface of the metal material is not subjected to a treatment capable of adhering the molding material and the metal material with each other. Examples of the treatment may include a surface treatment of a metal material with a triazine thiol-based surface treatment agent as disclosed in Patent Document 1, a surface roughening treatment of a metal material by chemical etching as disclosed in Patent Document 2, and a surface roughening treatment of a metal material by physical etching.

Therefore, a treatment that is inherently not a treatment for adhering the molding material and the metal material with each other, for example, a plating treatment on a metal material surface, is not included as "surface treatment for adhesion with the molding material". Accordingly, the surface of the metal material of the embodiment of the present invention may be plated with gold, silver, tin, nickel or the like.

The plating method is not particularly limited, and plating can be performed by previously known electroplating, electroless plating, hot-dipping, impact plating, vacuum coating (PVD etc.) or chemical vapor deposition (CVD etc.).

In the embodiment, the metal material is required to have an aspect ratio of 1 to 10 in a cross section perpendicular to a lengthwise direction of the metal material.

Figure 1:
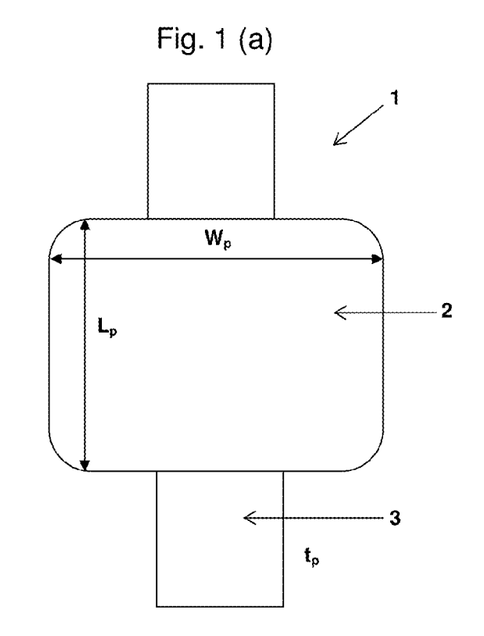
FIG. 1(a) is a view illustrating an external appearance of a metal insert-molded article according to one embodiment of the present invention.
FIG. 1(b) is a view illustrating an external appearance of a metal material used in the metal insert-molded article illustrated in FIG. 1(a).

FIG. 1(a) is a front view illustrating an external appearance of a metal insert-molded article 1 (hereinafter, referred to as "metal insert-molded article 1") having sealing ability according to one embodiment of the present invention. FIG. 1(b) is a front view illustrating an external appearance of a metal material used in the metal insert-molded article 1 illustrated in FIG. 1(a).

As illustrated in FIG. 1(a), the metal insert-molded article 1 includes a molding material 2 and a metal material 3.

In FIG. 1(a), $t_p$ represents the length in a front-rear direction (depth direction) on a surface of the molding material 2, i.e. the thickness of the molding material 2, $L_p$ represents the length of the molding material 2, and $W_p$ represents the width of the molding material 2.

FIG. 1(b), $t_m$ represents the length in a front-rear direction (depth direction) on a surface of the metal material 3, i.e. the thickness of the metal material 3. $L_m$ represents the length (length of long side) of the metal material 3, and $W_m$ represents the width (length of short side) of the metal material 3. In the metal material 3, the lengthwise direction is a direction parallel to the long side of the metal material 3, and the width direction is a direction parallel to the short side of the metal material 3.

The "cross section perpendicular to a lengthwise direction" refers to a cross section obtained by cutting the metal material along a plane perpendicular to the long side of the metal material and parallel to the short side of the metal material. For example, in the case of the metal material 3, the "cross section perpendicular to lengthwise direction" is a cross section obtained by cutting the metal material 3 in the $t_m$ direction along a plane perpendicular to $L_m$ and parallel to $W_m$. When the cross section is viewed from a lower direction toward an upper direction on the surface of the metal material 3, the cross section is a rectangular cross section of $t_m$ in a longitudinal direction and $W_m$ in a lateral direction. The corner portions of the cross section may be chamfered.

The "aspect ratio of 1 to 10 in a cross section perpendicular to a lengthwise direction" means that a value obtained by dividing the length of the long side of a metal material by the length of the short side of the metal material in the cross section is 1 to 10 in the case of the rectangular cross section.

The shape of the metal material is not particularly limited that is the two-dimensional shape of the metal material is not limited to a substantially rectangular shape as illustrated in FIG. 1(b). For example, when the metal material is substantially cubic, a direction parallel to any one of the sides of the metal material may be defined as a lengthwise direction because the lengths of the sides of the metal material are substantially the same, and the aspect ratio is 1. When the metal material is substantially spherical, a cross section obtained by cutting the metal material along a plane perpendicular to the diameter may be defined as the "cross section perpendicular to a lengthwise direction", with the lengthwise direction being a direction parallel to the diameter, and the aspect ratio is 1.

When the metal material is substantially elliptical, the lengthwise direction is a direction parallel to the long diameter of the ellipse, and a cross section obtained by cutting the metal material along a plane perpendicular to the long diameter and parallel to the short diameter of the ellipse is the "cross section perpendicular to a lengthwise direction". In this case, the aspect ratio is a value obtained by dividing the long diameter by the short diameter in the cross section.

When the metal material is substantially conical or pyramidal, a direction parallel to a perpendicular line drawn from the apex to the bottom face can be considered as the lengthwise direction, and an aspect ratio may be determined in a cross section perpendicular to the lengthwise direction.

When the cross-sectional shape of the metal material is a polygon other than a rectangle, an ellipse, a circle and a square, an aspect ratio is defined as a ratio of a longest side A in the cross section to, among lines (perpendicular lines) perpendicular to the longest side A, a perpendicular line B with the longest distance between the longest side A and the end point opposite to the longest side A.

Figures 2A, 2B, 2C:
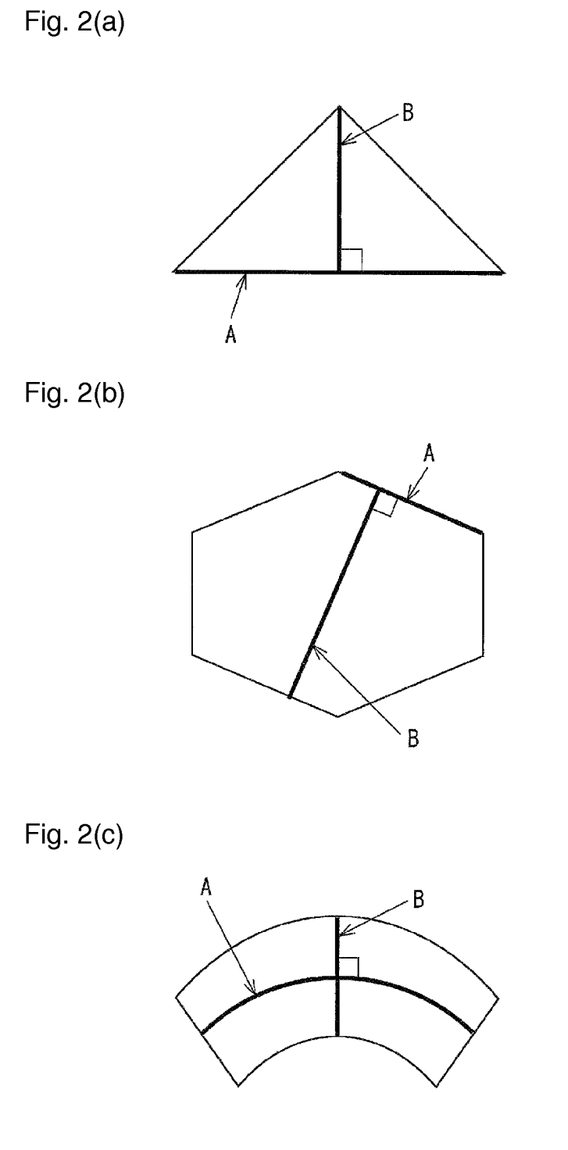
FIG. 2(a) is a sectional view where the cross section is triangular.
FIG. 2(b) is a sectional view where the cross section is hexagonal.
FIG. 2(c) is a sectional view where the cross section is a curved cross section.

For example, when the cross section is triangular, a longest side A and a longest perpendicular line B are adopted as illustrated in FIG. 2(a). In other words, when the cross section is triangular, the longest perpendicular line B corresponds to the height where the longest side A is the base. For example, when the longest side A has a length of 0.3 mm and the longest perpendicular line B has a length of 0.2 mm in FIG. 2(a), the aspect ratio is 0.3/0.2=1.5.

For example, when the cross section is hexagonal, a longest side A and a longest perpendicular line B are adopted as illustrated in FIG. 2(b). For example, when the longest side A has a length of 0.2 mm and the longest perpendicular line B has a length of 0.3 mm in FIG. 2(b), the aspect ratio is 0.3/0.2=1.5.

When the cross-sectional shape of the metal material is that of a curved cross section, a long side A and a short side B may be adopted as illustrated in FIG. 2(c) to define a ratio of length of the long side A to the short side B as an aspect ratio. In other words, the lengths corresponding to the long side and the short side in the rectangular cross section before the metal material is curved. When the long side A has a length of 0.6 mm and the short side B has a length of 0.2 mm in FIG. 2(c), the aspect ratio is 0.6/0.2=3.

Besides the examples described above, the shape of the metal material may also be a complicated shape in which the cross-sectional shape in the lengthwise direction is not definite (the aspect ratio varies depending on an adopted cross section). In this case, among cross sections obtained by cutting the metal material along a plane perpendicular to the lengthwise direction of the metal material and parallel to the short side of the metal material, an aspect ratio of a cross section having the lowest aspect ratio is determined.

As described above, in the metal insert-molded article according to the present invention, the content of the inorganic filler contained in the molding material is controlled to 0% by weight to 15% by weight to reduce shrinkage anisotropy, so that it is hard for a gap to be generated at an interface between the molding material and the metal material, whereby airtightness should be improved.

In addition, the metal material having an aspect ratio of 1 to 10 in a cross section perpendicular to a lengthwise direction can relieve stress on the metal material during shrinkage of the molding material to improve adhesion between the molding material and the metal material.

Further, the metal material is not surface-treated for adhesion with the molding material, and therefore even when the metal insert-molded article is applied in an electronic component, failure of electrical characteristics of the electronic component due to corrosion of a metal, etc. does not occur.

Thus, in embodiments of the present invention, the present inventors have extensively conducted studies on a technique capable of improving adhesion between the molding material and the metal material without using a surface treatment that may cause corrosion of a metal, and have discovered that the problems can be solved by setting both the inorganic filler content of the molding material and the aspect ratio of the metal material to the ranges specified in the present embodiments of the present invention.

<2. Method for Producing a Metal Insert-Molded Article Having Sealing Ability>

A method for producing a metal insert-molded article having sealing ability according to an embodiment of the present invention will be described below.

The metal insert-molded article having sealing ability according to the embodiment of the present invention includes a molding material which has a crystalline thermoplastic resin as a main component and contains an inorganic filler in an amount of 0% by weight to 15% by weight, and a metal material which has an aspect ratio of 1 to 10 in a cross section perpendicular to a lengthwise direction, and is not surface-treated for adhesion with the molding material as described above. Since the molding material and the metal material have been already described, detailed descriptions of the molding material and the metal material are omitted here. Herein, the "aspect ratio in a cross section perpendicular to a lengthwise direction" may be referred to as a "cross-sectional aspect ratio".

The metal insert-molded article having sealing ability according to the embodiment of the present invention is formed in a step of insert molding a metal material using the molding material. The insert molding method may include an injection molding method, a casting method and a compression method, and the appropriate method may be used according to the type of electronic component to which the metal insert-molded article is applied and the level of accuracy required for the molding.

In any one of the methods, firstly a metal material is placed in a mold. In the case of the injection molding method, subsequently a molten molding material is injected to fill the inside of the mold, and thereafter the molding material is cured by passing through maintained pressure and cooling steps. In the case of the casting method, a molten molding material is poured into the mold, and a curing agent is added or heat is applied, without applying external pressure, to cure the molding material. In the case of the compression method, a molding material is added in the mold, and thereafter pressure is applied by a compression molding machine to cure the molding material.

In the method for producing a metal insert-molded article having sealing ability according to the embodiment of the present invention, a molding material which has a crystalline thermoplastic resin as a main component and contains an inorganic filler in an amount of 0% by weight to 15% by weight, and a metal material which has an aspect ratio of 1 to 10 in a cross section perpendicular to a lengthwise direction, and is not surface-treated for adhesion with the molding material as described above are used. Therefore, a step of subjecting the metal material to a surface treatment with a triazine thiol-based surface treatment agent or a treatment such as etching can be omitted. Accordingly, costs can be reduced, and the production process can be simplified.

In the production method according to an embodiment of the present invention, it is preferred that the molding material contains an inorganic filler in an amount of 5% by weight to 15% by weight. This is because a metal insert-molded article having sealing ability which is excellent in airtightness and mechanical strength can be produced.

<3. Electronic Component Having Sealing Ability>

The electronic component according to an embodiment of the present invention is an electronic component having sealing ability, which includes the metal insert-molded article having sealing ability according to one embodiment of the present invention and a hollow structure in an inner part of the electronic component. At least a part of an interface between the molded material and the metal material of the metal insert-molded article is exposed on the surface of the electronic component.

The "hollow structure" refers to a structure having a space in the inner part of the electronic component. The "interface between the molding material and the metal material of the metal insert-molded article" refers to a coupled portion between the molding material and the metal material, which is created as a result of combining the molding material and the metal material by insert molding.

Figure 3:
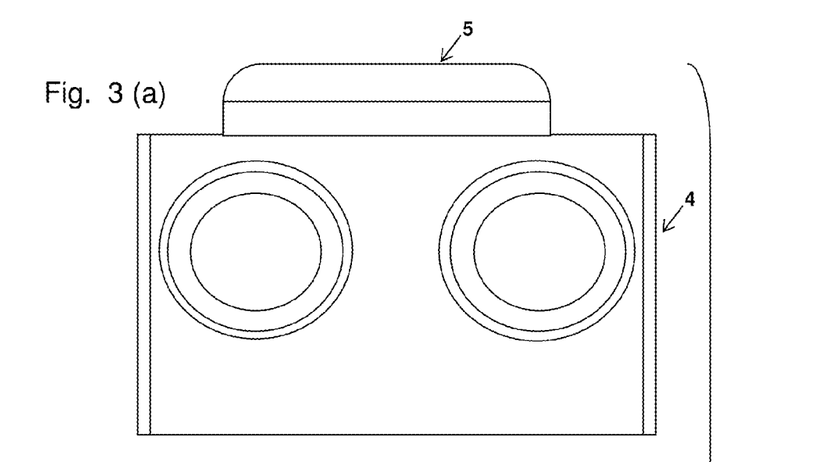
FIG. 3(a) is a front view of a cover portion of a switch according to one embodiment of the present invention.
FIG. 3(b) is a front view of a metal insert-molded article of a switch according to one embodiment of the present invention.
FIG. 3(c) is a sectional view of a metal material in a metal insert-molded article of a switch according to one embodiment of the present invention.

An electronic component having sealing ability according to one embodiment of the present invention will be described with reference to FIGS. 3(a)-3(c). FIG. 3(a) is a front view of cover portion 4 of a switch 100 according to the embodiment of the present invention, and FIG. 3(b) is a front view of a metal insert-molded article 1' of the switch 100 according to the embodiment of the present invention.

The electronic component illustrated in FIGS. 3(a)-3(c) includes the metal insert-molded article 1' (also referred to as base portion) having sealing ability according to the embodiment of the present invention, and the cover portion 4. The cover portion 4 is intended to internally store and protect at least a partial region of the base portion 1'. In FIGS. 3(a) and 3(b), the cover portion 4 has a shape like a casing, but its shape is not particularly limited.

For the molding material of the cover portion 4, a thermoplastic resin is used, but the molding material is not particularly limited. It is preferred that the cover portion 4 is molded using a thermoplastic resin identical to that of the base portion 1' because costs can be reduced and bonding can be easily performed.

The base portion 1' has a projected portion 6. The projected portion 6 is configured to receive an outer peripheral portion of the cover portion 4 covering the base portion 1', and the cover portion 4 is coupled with the projected portion 6 to form an electronic component (switch in this case) having a hollow structure. For coupling the cover portion 4 and the base portion 1', previously known means such as an adhesive or a laser may be used. In this embodiment, the metal material is configured as metal terminals 3' and 3".

In the base portion 1', the metal terminals 3' and 3" and a molding material 2' are integrally molded together by insert-molding. In the drawing, the part shown by a dotted line is a part covered with the molding material 2'.

When the metal terminals 3' and 3" have the shape illustrated in FIGS. 3(a)-3(c), the aspect ratio in a cross section having the lowest aspect ratio (cross section at a position shown by C-C' in FIG. 3(b)) in the insert part (part surrounded by a resin) is 1 to 10. The shape of the cross section having the lowest aspect ratio is, for example, that of the rectangular cross section illustrated in FIG. 3(c). For example, when the cross section has a width ($W_m$) of 0.6 mm and a thickness ($t_m$) of 0.4 mm in FIG. 3(c), the aspect ratio is 1.5.

As illustrated in FIG. 3(b), the metal terminal 3" is shorter than the metal terminal 3', and the leading end portion is not metallic, but is coupled with the molding material 2'.

Although not illustrated, a button 5 provided on the cover 4 is connected to a contact capable of contacting both the metal terminals 3' and 3". In a switched-off state, the contact is in contact with the molding material 2' coupled to the leading end portion of the metal terminal 3' and the leading end portion of the metal terminal 3". In this case, passage of electric current does not occur because the molding material 2' does not have conductivity.

When the button 5 is depressed, the contact is also depressed, and passage of electric current begins at the time when the contact comes into contact with both the metal terminals 3 and 3".

A part of the base portion 1' that is situated below the projected portion 6 is exposed on the outside of the cover portion 4. In FIG. 3(b), the interface between the molding material and the metal material of the metal insert-molded article is also present in the hollow structure, but an interface 7, which is at least a part of the interface between the molding material and the metal material of the metal insert-molded article, is exposed on a surface of the switch 100.

In this case, previously known electronic components have a problem that water or moisture may enter their insides through the interface 7 and airtightness cannot be maintained as described above. Hence, when a metal material surface-treated with a surface treatment agent is used, the insides of an electronic component can be corroded by the surface treatment agent or etching to cause failure of electrical characteristics of electronic component.

On the other hand, the electronic component having sealing ability according to the embodiment of the present invention includes the metal insert-molded article 1' having sealing ability. Therefore, an electronic component having enhanced airtightness is provided without necessity to subject a metal to a surface treatment with a triazine thiol-based surface treatment agent or etching. According to the above-mentioned configuration, neither a surface treatment agent can corrode the inside of an electronic component, nor a metal surface can be worn off by etching, and therefore a failure of the electrical characteristics of the electronic component can be prevented.

Further, when the inorganic filler content of the molding material is 5% by weight to 15% by weight, a mechanical strength necessary and sufficient for the electronic component can be achieved.

That is, according to the above-mentioned configuration, there is provided an electronic component having sealing ability, which has both airtightness and mechanical strength without necessity to apply an adhesive to an interface between the molding material and the metal material or to subject a metal surface to a surface treatment such as etching.

The electronic component having the sealing ability according to the embodiment of the present invention has a hollow structure, and is suitable for inserting components which require sealing for performance, such as switches, relays, connectors and sensors.

Embodiments of the present invention can also be configured as follows.

For solving the above-described problems, a metal insert-molded article having sealing ability according to the embodiments of the present invention is a metal insert-molded article having sealing ability which is formed by integrally molding a molding material and a metal material by insert molding. The molding material has a crystalline thermoplastic resin as a main component, and contains an inorganic filler in an amount of 0% by weight to 15% by weight, and the metal material has an aspect ratio of 1 to 10 in a cross section perpendicular to a lengthwise direction, and is not surface-treated for adhesion with the molding material.

According to the above-mentioned configuration, when the crystalline thermoplastic resin is shrunk in a direction of tightening of the metal material, shrinkage anisotropy caused by the inorganic filler can be reduced to make it hard to generate a gap at an interface between the molding material and the metal material, so that airtightness can be improved.

Further, according to the above-mentioned configuration, by ensuring that the aspect ratio in a cross section perpendicular to a lengthwise direction of the metal material is in a range of 1 to 10, stress on the metal material during shrinkage of the crystalline thermoplastic resin can be relieved, so that adhesion between the molding material and the metal material can be improved.

Accordingly, there can be provided a metal insert-molded article excellent in sealing ability which has improved adhesion between a molding material and a metal material without necessity to provide a chemical bond at an interface between the molding material and the metal material or to etch a metal surface.

In the metal insert-molded article having sealing ability according to the embodiments of the present invention, it is preferred that the molding material contains an inorganic filler in an amount of 5% by weight to 15% by weight.

According to the above-mentioned configuration, shrinkage anisotropy caused by the inorganic filler can be reduced to reduce a gap at an interface between the molding material and the metal material, and mechanical strength required for the electronic component can be sufficiently maintained.

Further, by ensuring that the aspect ratio in a cross section perpendicular to a lengthwise direction of the metal material is in a range of 1 to 10, stress on the metal material during shrinkage of the crystalline thermoplastic resin can be relieved to improve adhesion between the molding material and the metal material. Accordingly, the metal insert-molded article can contribute to provide an electronic component having both airtightness and mechanical strength at a high level.

The electronic component having sealing ability according to the embodiments of the present invention is an electronic component having sealing ability which includes the metal insert-molded article having sealing ability according to one embodiment of the present invention and which has a hollow structure in the inner part of the electronic component. At least a part of an interface between the molded material and the metal material of the metal insert-molded article is exposed on the surface of the electronic component.

According to the above-mentioned configuration, the metal insert-molded article having sealing ability according to embodiments of the present invention has excellent airtightness, and therefore even in the case of an electronic component which has a hollow structure while an interface between a molding material and a metal material is exposed on the surface of the electronic component, ingress of water etc. from the interface into the hollow structure can be prevented. As a result, the operation of a contact etc. provided in the hollow structure can be kept stable.

Therefore, there can be provided an electronic component excellent in airtightness and mechanical strength and also excellent in operation stability.

The electronic component having sealing ability according to embodiments of the present invention is preferably a switch, a relay, a connector or a sensor.

All these electronic components are electronic components that have a hollow structure while an interface between a molding material and a metal material is exposed on the surface of the electronic component, and that are widely used.

Therefore, according to the above-mentioned configuration, both airtightness and mechanical strength can be achieved and operation stability can be enhanced in these electronic components to achieve high versatility, and electronic components excellent in reliability can be widely provided.

The method for producing a metal insert-molded article having sealing ability according to embodiments of the present invention is a method for producing a metal insert-molded article having sealing ability, the method including: a step of insert molding a metal material using a molding material which has a crystalline thermoplastic resin as a main component, and contains an inorganic filler in an amount of 0% by weight to 15% by weight. The metal material has an aspect ratio of 1 to 10 in a cross section perpendicular to a lengthwise direction, and is not surface-treated for adhesion with the molding material.

According to the above-mentioned configuration, the inorganic filler content of the molding material and the aspect ratio in a cross section perpendicular to a lengthwise direction of the metal material are each adjusted to such a value that shrinkage anisotropy of the molding material caused by the inorganic filler can be reduced to relieve stress on the metal material during shrinkage of the crystalline thermoplastic resin.

Therefore, there can be provided a metal insert-molded article which is free from corrosion etc. of a metal material because it does not require a chemical bond at an interface between a molding material and a metal material and a step of etching a metal surface, and a metal insert-molded article having improved adhesion between a molding material and a metal can be produced by a low-cost, easy and convenient method.

In the method for producing a metal insert-molded article having sealing ability according to embodiments of the present invention, it is preferred that the molding material contains an inorganic filler in an amount of 5% by weight to 15% by weight.

According to the above-mentioned configuration, the content of the inorganic filler is increased within boundaries that do not hinder isotropy during shrinkage of the crystalline thermoplastic resin.

Therefore, there can be provided a metal insert-molded article which is free from corrosion etc. of a metal material because it does not require a chemical bond at an interface between a molding material and a metal material and a step of etching a metal surface, and a metal insert-molded article having improved adhesion between a molding material and a metal and having further improved mechanical strength can be produced by a low-cost, easy and convenient method.

EXAMPLES

Examples of embodiments of the present invention will be described below.

In the examples, insert molding is performed by an injection molding method. It is not necessary to use a special injection molding machine, and an injection molding machine that is commercially sold may be used. The molding method and molding conditions in the present invention are not particularly limited, but as common knowledge, it is desirable to adjust conditions such that a sufficient pressure maintaining force is applied to ensure that a molten resin is firmly adhered to a metal to be inserted.

[Airtight Test of Metal Insert-Molded Article]
<Sample Preparation Conditions>

Molding conditions are shown in Table 1. The prepared sample is a metal insert-molded article similar to that illustrated in FIGS. 1(a) and 1(b).

A molding material was prepared so as to have an inorganic filler content of 0 to 30% by weight using PBT or PPS as a crystalline thermoplastic resin composition.

The dimension of the molded article was set to ($L_p$: 15 mm)×($W_p$: 15 mm)×($t_p$: 3 mm). As for the metal material, brass plated with silver (Ag-plated brass) was used, and the dimension thereof was set to (length $L_m$: 25 mm)×(width $W_m$: 0.6 to 6 mm)×(thickness $t_m$: 0.3 to 0.6 mm).

TABLE 1

|  | Molding conditions |
|---|---|
| Nozzle temperature [° C.] | 265 |
| Mold temperature [° C.] | 70 |
| Metric [mm] | 22 |
| Pressure keeping force [kg/cm$^2$] | 200 |

The "metric" in the table is a distance over which a resin is extruded by an injection molding machine, and is a value that defines a volume of a molding material poured in a mold. This value is a value intrinsic to an injection molding machine.

The inorganic filler used was a silica ($SiO_2$)-based fibrous filler, and had a fiber diameter of ϕ10 to 30 μm and an average fiber length of 300 μm.

PBT or PPS was melted, the above-described inorganic filler and an additive to be described later were added, and the inorganic filler was kneaded and dispersed in the resin using a kneading extruder to prepare the molding material.

<Method for Evaluation of Airtightness>

Figure 4:
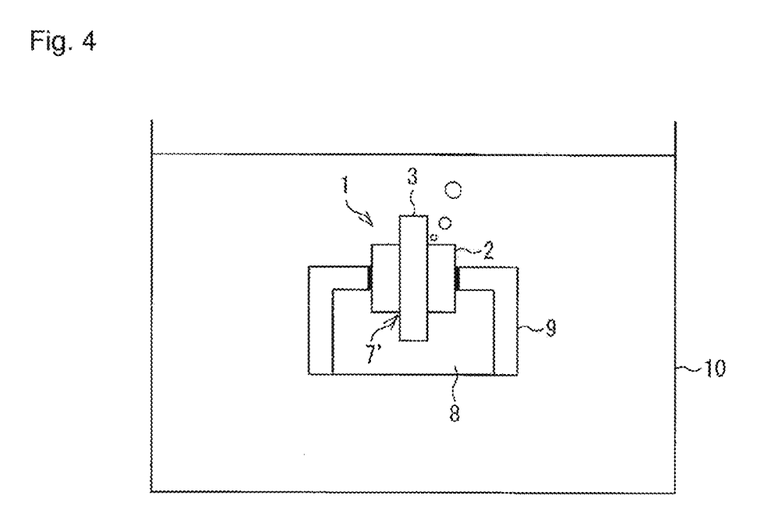
FIG. 4 is a schematic view of a bubble leak test tool used for evaluation of airtightness in examples of the present invention.

The method for evaluation of airtightness was performed by referring to JIS Standard C0026 (IEC60068-2-17) Airtightness Test. FIG. 4 is a schematic view of a bubble leak test tool used for evaluation of airtightness.

An evaluation sample (metal insert molded-article 1) was fixed on a bubble leak test tool 9 having a bubble reservoir 8 as illustrated in FIG. 4, and wholly immersed in a perfluorocarbon liquid bath 10 of a bubble leak test device. The evaluation sample (metal insert molded-article 1) was fixed on the test tool 9 using an adhesive so that bubbles did not leak from the fixation part. In the figure, the parts shown by the thick lines are bonding parts.

The liquid temperature of perfluorocarbon was elevated from room temperature: 25° C. at an interval of 5° C., and a temperature was measured at where bubbles were generated from an interface 7' between the molding material and the metal material when the sample was left alone for 3 minutes at each temperature. The acceptance criterion of airtightness was set to a requirement that leakage should not occur at a liquid temperature of 85° C. based on an assumption that the usage environment for the electronic components is in household electric appliances and vehicle-mounted applications. A test was conducted with a number of samples being n=5 in each molding condition. In this connection, in the following examples, the leakage temperature of a sample having the lowest airtightness in the five samples is described.

As described above, the phrase "having sealing ability" herein means that the acceptance criterion of airtightness is satisfied in the airtightness evaluation method used in examples to be described later without necessity to apply an adhesive to an interface between a molding material and a metal material or to subject a metal surface to a surface treatment such as etching.

Use of PBT as Crystalline Thermoplastic Resin

Examples 1 to 5 and Comparative Example 1

Using PBT as a crystalline thermoplastic resin, the airtightness test was conducted while the content of an inorganic filler in a molding material was changed. Molding conditions in the examples and a comparative example are shown below.

Examples 1 to 4

A sample as illustrated in FIGS. 1(a) and 1(b) was prepared using: a molding material including PBT, an inorganic filler and other additives (bromine-based flame retardant and antimony compound) in an amount that will not impair the effect of embodiments of the present invention. The inorganic filler content was 0 to 15% by weight based on 100% by weight of the molding material. The contents of the bromine-based flame retardant and the antimony compound were 13% by weight and 7% by weight, respectively, based on 100% by weight of the molding material. The metal material used was Ag-plated brass having a rectangular cross section with a width $W_m$ of 1.5 mm and a thickness t, of 0.3 mm in the cross section and a cross-sectional aspect ratio of 5. The bromine-based flame retardant and the antimony compound were used for flame retardation of the molding material.

Comparative Example 1

A sample as illustrated in FIGS. 1(a) and 1(b) was prepared using: a molding material including PBT, an inorganic filler and additives. The inorganic filler content was 30% by weight. The contents of the bromine-based flame retardant and the antimony compound were 13% by weight and 7% by weight, respectively. The metal material used was Ag-plated brass having a rectangular cross section with a long diameter $W_m$ of 1.5 mm and a short diameter $t_m$ of 0.3 mm in the cross section and a cross-sectional aspect ratio of 5. Additives used in Examples 5 to 11 and Comparative Examples 2 and 3 are identical to those used in Examples 1 to 4.

Example 5

A sample as illustrated in FIGS. 1(a) and 1(b) was prepared using: a molding material including PBT, an inorganic filler and additives. The inorganic filler content was 5% by weight. The contents of the bromine-based flame retardant and the antimony compound were 13% by weight and 7% by weight, respectively. The metal material used was elliptical post-shaped Ag-plated brass with a long diameter $W_m$ of 1.5 mm and a short diameter $t_m$ of 0.3 mm in the cross section and a cross-sectional aspect ratio of 5.

The test results are shown in Table 2. Excellent airtightness was achieved when the inorganic filler content was in a range of 0 to 15% by weight. Excellent airtightness was also achieved in Example 5 where the cross section of the metal material was elliptical.

TABLE 2

| Examples | Inorganic filler content [% by weight] | $W_m$ [mm] | $t_m$ [mm] | Aspect ratio [$W_m/t_m$] | Leakage temperature [° C.] |
|---|---|---|---|---|---|
| Example 1 | 0 | 1.5 | 0.3 | 5 | 96 |
| Example 2 | 5 | 1.5 | 0.3 | 5 | 93 |
| Example 3 | 7.5 | 1.5 | 0.3 | 5 | 90 |
| Example 4 | 15 | 1.5 | 0.3 | 5 | 86 |
| Comparative Example 1 | 30 | 1.5 | 0.3 | 5 | 79 |
| Example 5 | 5 | 1.5 | 0.3 | 5 | 95 |

Examples 6 to 11 and Comparative Examples 2 and 3

Using PBT as a crystalline thermoplastic resin, the airtightness test was conducted while the content of an inorganic filler in a molding material and the cross-sectional aspect ratio were changed. Ag-plated brass having a rectangular cross section was used as a metal material. Molding conditions in the examples and comparative example are shown below.

Examples 6 to 8

A sample as illustrated in FIGS. 1(a) and 1(b) was prepared as follows: the inorganic filler content was 0% by weight, the contents of the bromine-based flame retardant and the antimony compound were 13% by weight and 7% by weight, respectively, in the molding material, and the metal material had a width $W_m$ of 0.3 to 3.0 mm, a thickness $t_m$ of 0.3 mm and a cross-sectional aspect ratio of 1 to 10.

Comparative Example 2

A sample as illustrated in FIGS. 1(a) and 1(b) was prepared as follows: the inorganic filler content was 0% by weight, the contents of the bromine-based flame retardant and the antimony compound were 13% by weight and 7% by weight, respectively, in the molding material, and the metal material had a width W, of 6.0 mm, a thickness $t_m$ of 0.3 mm and a cross-sectional aspect ratio of 20.

Examples 9 to 11

A sample as illustrated in FIGS. 1(a) and 1(b) was prepared as follows: the inorganic filler content was 5% by weight, the contents of the bromine-based flame retardant and the antimony compound were 13% by weight and 7% by weight, respectively, in the molding material, and the metal material had a width $W_m$ of 0.3 to 3.0 mm, a thickness $t_m$ of 0.3 mm and a cross-sectional aspect ratio of 1 to 10.

Comparative Example 3

A sample as illustrated in FIGS. 1(a) and 1(b) was prepared as follows: the inorganic filler content was 5% by weight, the contents of the bromine-based flame retardant and the antimony compound were 13% by weight and 7% by weight, respectively, in the molding material, and the metal material had a width $W_m$ of 6.0 mm, a thickness $t_m$ of 0.3 mm and a cross-sectional aspect ratio of 20.

The test results are shown in Table 3. Excellent airtightness was achieved when the cross-sectional aspect ratio was in a range of 1 to 10. Even in a sample having a low inorganic filler content, bubbles only leaked at a temperature below 80° C. when the cross-sectional aspect ratio was more than 10.

TABLE 3

| Examples | Inorganic filler content [% by weight] | $W_m$ [mm] | $t_m$ [mm] | Aspect ratio [$W_m/t_m$] | Leakage temperature [° C.] |
|---|---|---|---|---|---|
| Example 6 | 0 | 0.3 | 0.3 | 1 | 100 |
| Example 7 | 0 | 2.0 | 0.3 | 6.7 | 94 |
| Example 8 | 0 | 3.0 | 0.3 | 10 | 91 |
| Comparative Example 2 | 0 | 6.0 | 0.3 | 20 | 79 |
| Example 9 | 5 | 0.3 | 0.3 | 1 | 96 |
| Example 10 | 5 | 2.0 | 0.3 | 6.7 | 91 |
| Example 11 | 5 | 3.0 | 0.3 | 10 | 87 |
| Comparative Example 3 | 5 | 6.0 | 0.3 | 20 | 74 |

<Use of PPS as Crystalline Thermoplastic Resin>

Using PPS as a crystalline thermoplastic resin for forming a molding material, the airtightness test was conducted while the inorganic filler content was changed. Ag-plated brass having a rectangular cross section was used as a metal material. Molding conditions in the examples and comparative example are shown below.

Examples 12 to 14

A sample as illustrated in FIGS. 1(a) and 1(b) was prepared as follows: the inorganic filler content was 0 to 15% by weight, the content of an additive (lubricant) was 5% by weight in the molding material, and the metal material had a width $W_m$ of 1.5 mm, a thickness $t_m$ of 0.3 mm and a cross-sectional aspect ratio of 5.

Comparative Example 4

A sample as illustrated in FIGS. 1(a) and 1(b) was prepared as follows: the inorganic filler content was 30% by weight, the content of a lubricant was 5% by weight in the molding material, and the metal material had a width $W_m$ of 1.5 mm, a thickness $t_m$ of 0.3 mm and a cross-sectional aspect ratio of 5.

Example 15

A sample as illustrated in FIGS. 1(a) and 1(b) was prepared as follows: the inorganic filler content was 7.5% by weight, the content of a lubricant was 5% by weight in the molding material, and the metal material had a width $W_m$ of 1.5 mm, a thickness $t_m$ of 0.3 mm and a cross-sectional aspect ratio of 10.

Comparative Example 5

A sample as illustrated in FIGS. 1(a) and 1(b) was prepared as follows: the inorganic filler content was 7.5% by weight, the content of a lubricant was 5% by weight in the molding material, and the metal material had a width $W_m$ of 6.0 mm, a thickness $t_m$ of 0.3 mm and a cross-sectional aspect ratio of 20.

The test results are shown in Table 4. Similarly to the case where PBT was used, excellent airtightness was achieved when the inorganic filler content was in a range of 0 to 15% by weight and a cross-sectional aspect ratio was in a range of 1 to 10.

TABLE 4

| Examples | Inorganic filler content [% by weight] | $W_m$ [mm] | $t_m$ [mm] | Aspect ratio [$W_m/t_m$] | Leakage temperature [° C.] |
|---|---|---|---|---|---|
| Example 12 | 5 | 1.5 | 0.3 | 5 | 99 |
| Example 13 | 7.5 | 1.5 | 0.3 | 5 | 91 |
| Example 14 | 15 | 1.5 | 0.3 | 5 | 88 |
| Comparative Example 4 | 30 | 1.5 | 0.3 | 5 | 79 |
| Example 15 | 7.5 | 3.0 | 0.3 | 10 | 86 |
| Comparative Example 5 | 7.5 | 6.0 | 0.3 | 20 | 82 |

From the results described above, it is apparent that when a metal material designed to have a cross-sectional aspect ratio of 1 to 10 is insert-molded using a crystalline thermoplastic resin molding material having an inorganic filler content of 15% by weight or less, adhesion at an interface between the molding material and the metal material can be improved.

[Electronic Component Having Hollow Structure]

Figure 5:
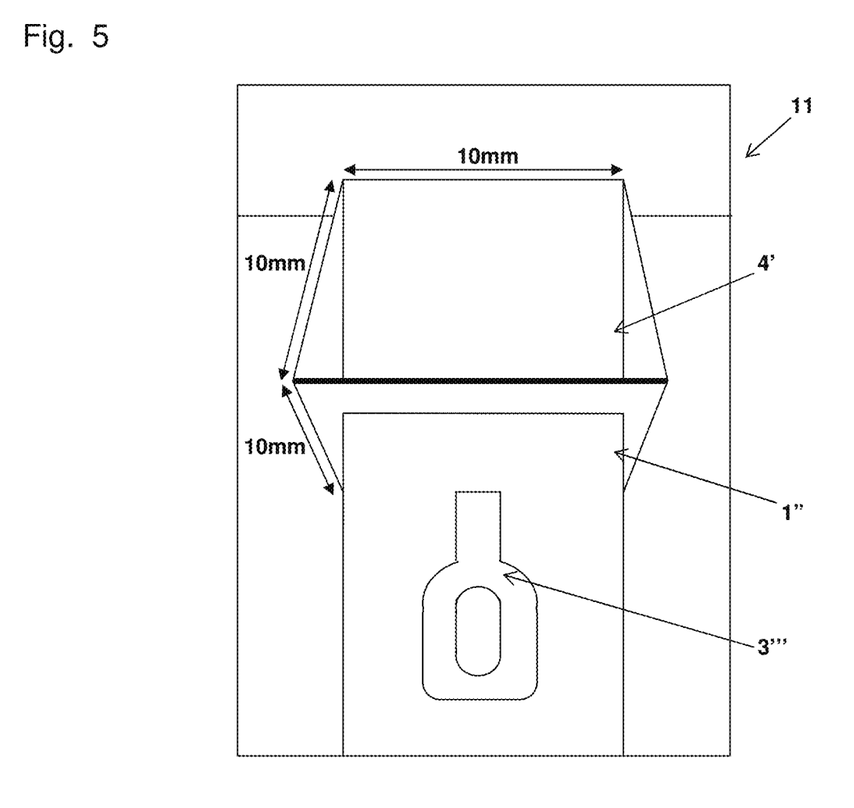
FIG. 5 is an external perspective view of an electronic component sample used in examples of the present invention.

Electronic component sample 11 in FIG. 5 illustrates an electronic component having a hollow structure, such as a relay or a switch. The electronic component sample 11 comprises a molded article that was a 10-mm cube, and PBT was used as a crystalline thermoplastic resin in the molding material of a cover portion 4' and a base portion 1" of the molded article.

An inorganic filler used was a silica ($SiO_2$)-based fibrous filler with a line diameter of ϕ10 to 30 μm and an average fiber length of 300 μm. As additives, a bromine-based flame retardant and an antimony compound were used in amounts of 13% by weight and 7% by weight, respectively, based on 100% by weight of the molding material. PBT was melted, the above-described inorganic filler and additives were added, and the inorganic filler was kneaded and dispersed in the resin using a kneading extruder to prepare the molding material.

Figure 6A:
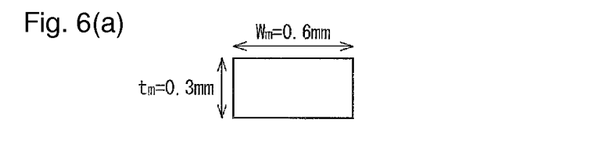
FIGS. 6(a) and 6(b) are sectional views of an insert portion of a metal terminal used in examples of the present invention.
Figure 6B:
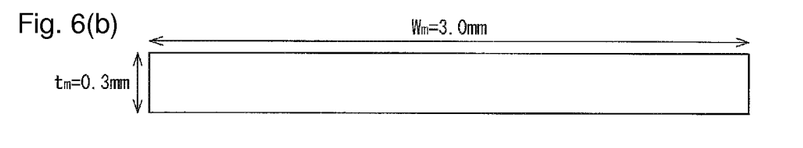

Wall thickness of the resin of the base portion 1" was set to 3 mm. Brass was used for a metal terminal 3''', and among cross sections of an insert portion (cross sections of a portion surrounded by the molding material), the dimension of a cross section having the lowest cross-sectional aspect ratio was set to (width $W_m$: 0.6 to 3 mm)×(thickness $t_m$: 0.3 mm). FIGS. 6(a) and 6(b) illustrates a shape of the cross section having the lowest cross-sectional aspect ratio.

The base portion 1" was insert-molded by an injection molding method. The cover portion 4' and the base portion 1" were coupled at the resin interface using an adhesive and a laser.

The acceptance criterion of airtightness with the present sample was set to a leakage temperature of 85° C., and a test was conducted with the number of samples being n=5. For evaluating the terminal strength of the electronic component, the test was conducted by referring to JIS Standard C60068-2-21. In the evaluation method, a tensile force was gradually applied in a direction away from the component body of the electronic component along an axis direction of the metal terminal 3''' until the tensile force reached a predefined level, and this state was held for 1 minute. The acceptance criterion of the terminal tensile strength was set to 50 N, i.e. a requirement that the molding resin should not be ruptured on an assumption that the usage environment for the electronic components is in household electric appliances and vehicle-mounted applications.

Examples 16 to 20 and Comparative Example 6

Using the above-described sample, an airtightness test and a terminal tensile strength test were conducted while the content of an inorganic filler in a molding material and the cross-sectional aspect ratio were changed. Molding conditions in the examples and comparative example are shown below.

Examples 16 and 17

A sample as illustrated in FIG. 5 was prepared as follows: the molding material had an inorganic filler content of 5% by weight and 15% by weight, and the metal material was Ag-plated brass and had a cross-sectional aspect ratio of 2. FIG. 6(a) illustrates a shape of the cross section having the lowest cross-sectional aspect ratio.

Example 18

A sample as illustrated in FIG. 5 was prepared as follows: the molding material had an inorganic filler content of 15% by weight, and the metal material was Ag-plated brass and had a cross-sectional aspect ratio of 10. FIG. 6(b) illustrates a shape of the cross section having the lowest cross-sectional aspect ratio.

Example 19

A sample as illustrated in FIG. 5 was prepared as follows: the molding material had an inorganic filler content of 15% by weight, and the metal material was brass which was not plated with Ag, and had a cross-sectional aspect ratio of 10. FIG. 6(b) illustrates a shape of the cross section having the lowest cross-sectional aspect ratio.

Example 20

A sample as illustrated in FIG. 5 was prepared as follows: the molding material had an inorganic filler content of 0% by weight, and the metal material was Ag-plated brass and had a cross-sectional aspect ratio of 2. FIG. 6(a) illustrates a shape of the cross section having the lowest cross-sectional aspect ratio.

Comparative Example 6

A sample as illustrated in FIG. 5 was prepared as follows: the molding material had an inorganic filler content of 20% by weight, and the metal material was Ag-plated brass and had a cross-sectional aspect ratio of 2. FIG. 6(a) illustrates a shape of the cross section having the lowest cross-sectional aspect ratio.

The test results are shown in Table 5.

TABLE 5

| Examples | Inorgnic filler content [% by weight] | $W_m$ [mm] | $t_m$ [mm] | Aspect ratio $[W_m/t_m]$ | Airtight-ness (Test at 85° C.) | Terminal tensile strength (Test at 50N) |
|---|---|---|---|---|---|---|
| Example 16 | 5 | 0.6 | 0.3 | 2 | All samples OK | All samples OK |
| Example 17 | 15 | 0.6 | 0.3 | 2 | All samples OK | All samples OK |
| Example 18 | 15 | 3.0 | 0.3 | 10 | All samples OK | All samples OK |
| Example 19 | 15 | 3.0 | 0.3 | 10 | All samples OK | All samples OK |
| Example 20 | 0 | 0.6 | 0.3 | 2 | All samples OK | ⅔ OK |
| Comparative Example 6 | 20 | 0.6 | 0.3 | 2 | ⅓ OK | All samples OK |

From the results described above, it is apparent that when a metal material designed to have a cross-sectional aspect ratio of 10 or less is insert-molded using a molding material having an inorganic filler content of 5 to 15% by weight, an electronic component which has improved adhesion at an interface between the molding material and the metal material can be obtained. The electronic component will be excellent in sealing characteristic (sealing ability) and also excellent in mechanical strength.

Embodiments of the present invention are not limited to those described above, various changes can be made within the scope described in the claims, and embodiments obtained by appropriately combining technical means disclosed in different embodiments are also included in the technical scope of the present invention.

Embodiments of the present invention can be utilized particularly for insert components which require sealing for performance, such as switches, relays, connectors and sensors, amongst electronic components having a hollow structure.

The invention claimed is:

1. A metal insert-molded article having sealing ability, the metal insert-molded article comprising:
a molding material and a metal material integrally molded together by insert molding, the molding material being in contact with the metal material;
wherein:
the molding material comprises a crystalline thermoplastic resin as a main component and an inorganic filler in an amount of 0% by weight to 15% by weight; and
the metal material has an aspect ratio of 1 to 10 in a cross section perpendicular to a lengthwise direction of the metal material, and is not surface-treated for adhesion with the molding material to form a chemical bond at an interface between the molding material and the metal material or to etch a surface of the metal material,
the metal material has cross sections with different aspect ratios, and the cross sections perpendicular to the lengthwise direction of the metal material include a cross section of the metal material having a lowest aspect ratio, and
a portion of the metal material with the cross section having the lowest aspect ratio is not exposed as a surface of the metal insert-molded article.

2. The metal insert-molded article according to claim 1, wherein the molding material comprises the inorganic filler in an amount of 5% by weight to 15% by weight.

3. An electronic component having sealing ability, the electronic component comprising:
the metal insert-molded article according to claim 2; and
a hollow structure in an inner part of the electronic component, wherein at least a part of an interface between the molding material and the metal material of the metal insert-molded article is exposed on a surface of the electronic component.

4. The electronic component according to claim 3, wherein the electronic component is one of a switch, a relay, a connector or a sensor.

5. An electronic component having sealing ability, the electronic component comprising:
the metal insert-molded article according to claim 1; and
a hollow structure in an inner part of the electronic component wherein at least a part of an interface between the molding material and the metal material of the metal insert-molded article is exposed on a surface of the electronic component.

6. The electronic component according to claim 5, wherein the electronic component is one of a switch, a relay, a connector or a sensor.

7. A method for producing a metal insert-molded article having sealing ability, the method comprising:
insert-molding a metal material using a molding material, the molding material comprising a crystalline thermoplastic resin as a main component, and comprising an inorganic filler in an amount of 0% by weight to 15% by weight, the molding material being contact with the metal material;
wherein the metal material has an aspect ratio of 1 to 10 in a cross section perpendicular to a lengthwise direction of the metal material, and is not surface-treated for adhesion with the molding material to form a chemical bond at an interface between the molding material and the metal material or to etch a surface of the metal material,
wherein the metal material has cross sections with different aspect ratios, and the cross sections perpendicular to the lengthwise direction of the metal material include a cross section of the metal material having a lowest aspect ratio, and wherein the method further comprises:

integrally molding the cross sections perpendicular to the lengthwise direction of the metal material to the molding material such that a portion of the metal material with the cross section having the lowest aspect ratio is not exposed as a surface of the metal insert-molded article.

8. The method according to claim 7, wherein the molding material comprises an inorganic filler in an amount of 5% by weight to 15% by weight.

* * * * *